United States Patent [19]

Meister et al.

[11] Patent Number: 5,490,449

[45] Date of Patent: Feb. 13, 1996

[54] TEMPERATURE CONTROLLER FOR COOKING APPLIANCE

[75] Inventors: John A. Meister, Haughton; John R. Davis, Shreveport, both of La.

[73] Assignee: The Frymaster Corporation, Shreveport, La.

[21] Appl. No.: 17,758

[22] Filed: Feb. 16, 1993

[51] Int. Cl.$^6$ ................................................. A47J 27/00
[52] U.S. Cl. ...................... 99/330; 99/331; 99/332; 99/336; 99/403
[58] Field of Search .................... 99/331, 330, 332, 99/336, 403

[56] References Cited

U.S. PATENT DOCUMENTS

| | | | |
|---|---|---|---|
| 4,278,872 | 7/1981 | Koether et al. | 99/330 |
| 4,437,159 | 3/1984 | Waugh. | |
| 4,549,527 | 10/1985 | Davis. | |
| 4,585,925 | 4/1986 | Andre | 99/330 |
| 4,663,710 | 5/1987 | Waugh et al. | |
| 4,672,540 | 6/1987 | Waugh et al. | |
| 4,682,012 | 7/1987 | Wolf et al. | 99/330 |
| 4,913,038 | 4/1990 | Burkett et al. | 99/331 |
| 4,920,948 | 5/1990 | Koether et al. | 99/330 |
| 5,090,305 | 2/1992 | Lehman | 99/330 |
| 5,186,097 | 2/1993 | Vaseloff et al. | 99/330 |

Primary Examiner—David Scherbel
Assistant Examiner—James F. Hook
Attorney, Agent, or Firm—Harry J. Watson; Harris, Tucker & Hardin

[57] ABSTRACT

In accordance with the present invention a cooking appliance 10 is disclosed comprising heating element 14 in thermal communication with a cooking medium 12 for cooking food, temperature sensing element 18 for detecting a cooking medium temperature and control 20 connected to the temperature sensing element 18 for receiving the cooking medium temperature, wherein the control 20 is operable to generate a working temperature which may differ from the cooking medium temperature in order to account for a thermal transit time between the heating element 14 and the temperature sensing element 18, and further operable for regulating the heating element 14 in accordance with the working temperature. Other devices, systems and methods are disclosed.

13 Claims, 2 Drawing Sheets

TEMPERATURE CONTROLLER FOR COOKING APPLIANCE

TECHNICAL FIELD OF THE INVENTION

The present invention relates to a cooking appliance and more particularly to a cooking appliance including a temperature controller for controlling the temperature of the medium used for cooking.

BACKGROUND OF THE INVENTION

Heretofore in this field, automatic controllers have been used to regulate the temperature of a cooking medium, such as oil or shortening, in a cooking appliance, such as a deep fat fryer. Typical controllers are based on microprocessors which execute software programs stored in associated memory, such as read-only memory (ROM), for example. The microprocessor and ROM may be contained on the same integrated circuit, but this is not necessary. The microprocessor typically has a plurality of input/output (I/O) ports operable to receive data indicative of the state of the fryer and/or the cooking medium and further operable to output control signals to the fryer. In a typical system, the temperature of the cooking medium is sensed by a temperature sensing probe and this temperature is input to the control system. The control system then compares this temperature reading with the desired cooking medium temperature and outputs a control signal which turns on or turns off a burner or electrical heating element. The desired cooking medium temperature may be placed into the ROM during manufacture of the controller or during use in the field, if provision has been made in the design of the controller for programming by the user. This desired temperature is normally expressed as a "set point", or target temperature.

Advanced fryers require relatively sophisticated automatic controllers to keep the cooking medium at the set point primarily because the temperature of the cooking medium is significantly lowered when uncooked food is placed into the cooking medium. This effect is particularly problematic when frozen food is placed into the cooking medium. The large temperature differential between the frozen food and the hot cooking medium enables a significant amount of thermal energy to be quickly transferred from the cooking medium to the food, lowering the temperature of the cooking medium below the set point. The amount of temperature reduction is unpredictable and depends on such factors as the quantity of food, the food temperature, the effective surface area of the food, the temperature of the basket which holds the food, and many other factors. The control system is designed to return the cooking medium temperature to the set point as rapidly as possible while minimizing the overshoot of the set point.

A significant problem in prior art cooking device controllers has been the large amount of overshoot encountered while attempting to arrive at the set point. The problem arises when heat is applied to the fryer to compensate for a lowering of the cooking medium temperature caused by the uncooked food being placed into the cooking medium. The indicated temperature at the temperature sensing probe normally rises a significant amount of time after the heat is applied to the cooking medium. This lag time is due to the thermal transit time through the cooking medium from the heat source to the temperature sensing probe. During heating, this inertia in the temperature sensing system causes the indicated temperature of the cooking medium to be less than the actual temperature of the cooking medium closer to the heating element. Therefore, if the heat is removed from the cooking medium once the set point temperature is reached at the temperature sensing probe, the temperature lag time results in the temperature of the cooking medium at the probe location continuing to rise and overshooting the set point. The converse is also true. When heat is removed from the cooking medium, its temperature near the heating element falls faster than the indicated temperature of the temperature sensing probe. The indicated temperature of the cooking medium is therefore higher than the actual temperature. The inertia in the temperature sensing system will cause the indicated temperature of the cooking medium to continue to fall even after heat is reapplied to the system. The indicated temperature will not begin to rise again until all of the thermal masses between the heating element and the temperature sensing probe are thermally charged.

A number of different prior art algorithms have been written using proportion control in an effort to limit temperature overshoot and still achieve a rapid return to the set point under different load conditions. These programs have had less than desirable success because of the slow response or necessarily poor location of the temperature sensing probe.

SUMMARY OF THE INVENTION

It is therefore the object of the present invention to provide a software control routine which overcomes most of the problems of the prior art cooking device temperature controllers associated with poor temperature sensing probe location, slow temperature sensing probe response and excessive heat storage characteristics of high capacity, high efficiency deep fat fryers.

In accordance with the present invention a microprocessor controlled deep fat fryer is disclosed, comprising a frypot for storing a quantity of cooking oil, means for heating the cooking oil in order to cook a food product, means for sensing a sensed temperature of the cooking oil and a microprocessor controller operable to regulate the means for heating based on the sensed temperature and on other data, the regulation accounting for a thermal transit time between the means for heating and the means for sensing.

In another form of the invention, a microprocessor controlled deep fat fryer is disclosed, comprising a frypot for storing a quantity of cooking oil, means for heating the cooking oil in order to cook a food product, means for sensing a sensed temperature of the cooking oil and a microprocessor controller connected to the means for sensing in order to receive the sensed temperature and further connected to the means for heating, and operable to generate a working temperature which may differ from the sensed temperature in order to account for a thermal transit time between the means for heating and the means for sensing, the microprocessor controller further operable to regulate the means for heating in accordance with the working temperature.

In another form of the invention, a microprocessor controlled deep fat fryer is disclosed, comprising a frypot for storing a quantity of cooking oil, means for heating the cooking oil in order to cook a food product, means for sensing a sensed temperature of the cooking oil and a microprocessor controller connected to the means for sensing in order to receive the sensed temperature and further connected to the means for heating, and operable to generate a working temperature which may differ from the sensed temperature in order to account for a thermal transit time between the means for heating and the means for sensing, the microprocessor controller further operable to deactivate the means for heating until an end of a cook cycle if the cook cycle is within a preset number of seconds from ending and if the working temperature is within a preset number of degrees from a preset temperature.

In another form of the invention, a microprocessor controlled deep fat fryer is disclosed, comprising a frypot for storing a quantity of cooking oil, means for heating the cooking oil in order to cook a food product and a microprocessor controller connected to the means for heating and operable to deactivate the means for heating for a preset time period after the food product is removed from the cooking oil.

In another form of the invention, a method for operating a deep fat fryer is disclosed, comprising the steps of placing a food product into a frypot containing a quantity of cooking oil, providing a heating means in thermal communication with the cooking oil, sensing an indicated temperature of the cooking oil at a location, generating a working temperature which may differ from the indicated temperature in order to account for a thermal transit time between the heating means and the location and regulating the heating means in accordance with the working temperature and other data.

BRIEF DESCRIPTION OF THE DRAWINGS

The novel features believed to be characteristic of the invention are set forth in the appended claims. The invention itself, however, as well as other features and advantages thereof, will be best understood by reference to the detailed description which follows, read in conjunction with the accompanying drawings, wherein:

DETAILED DESCRIPTION OF THE DRAWINGS

Figure 1:
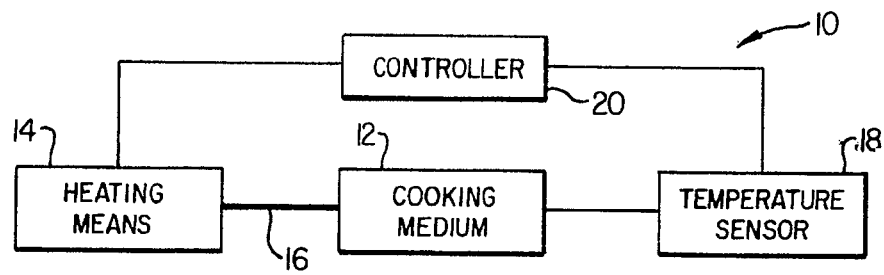
FIG. 1 is a schematic block diagram of a cooking appliance incorporating the present invention.

The present invention is directed towards an automatic temperature controller for use in conjunction with a cooking appliance, such as a deep fat fryer, employing a cooking medium, such as oil or shortening, into which food to be cooked is immersed. The fryers described in U.S. Pat. Nos. 4,848,318, 4,751,915 and 4,898,151, which are assigned to the same assignee as the present invention and hereby incorporated by reference, are representative of the type of fryer for which the automatic temperature controller of the present invention is contemplated. Referring to FIG. 1, such a cooking device is represented in schematic block diagram form and designated generally as 10. The cooking appliance includes a cooking medium 12 which is in thermal communication with heating means 14. Path 16 indicates the path of thermal communication between heating means 14 and cooking medium 12. Heating means 14 will typically include a burner and burner radiator, or an electric heating element immersed in the cooking medium 12, for example. A temperature sensor 18 is also provided for sensing a temperature of cooking medium 12. Finally, a controller 20 is provided which regulates the heating means 14 based upon temperature information supplied to it by temperature sensor 18.

When the burner on a deep fat fryer is activated, the thermal energy produced must pass from the burner to, for example, the burner radiators, the cooking pot and the oil before it is transmitted to the food being cooked. Each of these transferring mediums have a particular thermal mass associated with them. As the thermal energy passes from one medium to the next, the transfer is not thermally efficient. The medium itself heats up and stores thermal energy in addition to passing it to the next medium. Therefore, each of the thermal transfer mediums must be thermally charged by the thermal energy source before efficient thermal transfer may proceed. This results in a delay between the time when the burner produces thermal energy and the time when the food begins to receive it. Also, the thermal masses closer to the burner will reach the burner temperature before the thermal masses which are more remote. A similar effect occurs in relation to the "hot spot" at the back of the frypot where the exhaust gas flue is located.

The automatic temperature controller of the present invention is designed to anticipate the arrival of the delayed thermal energy before it actually arrives at the food. The controlling routine used to operate the fryer may perform many functions, but the present invention concerns only specific portions of the entire control routine, such as the portion which determines the temperature to be used in calculations by the rest of the routine (i.e. the working temperature), and the portions of the control routine which activate the burner. It is contemplated that the present invention as disclosed herein may be used in conjunction with any cooking appliance control routine, hence only the novel aspects are described herein.

Figure 2:
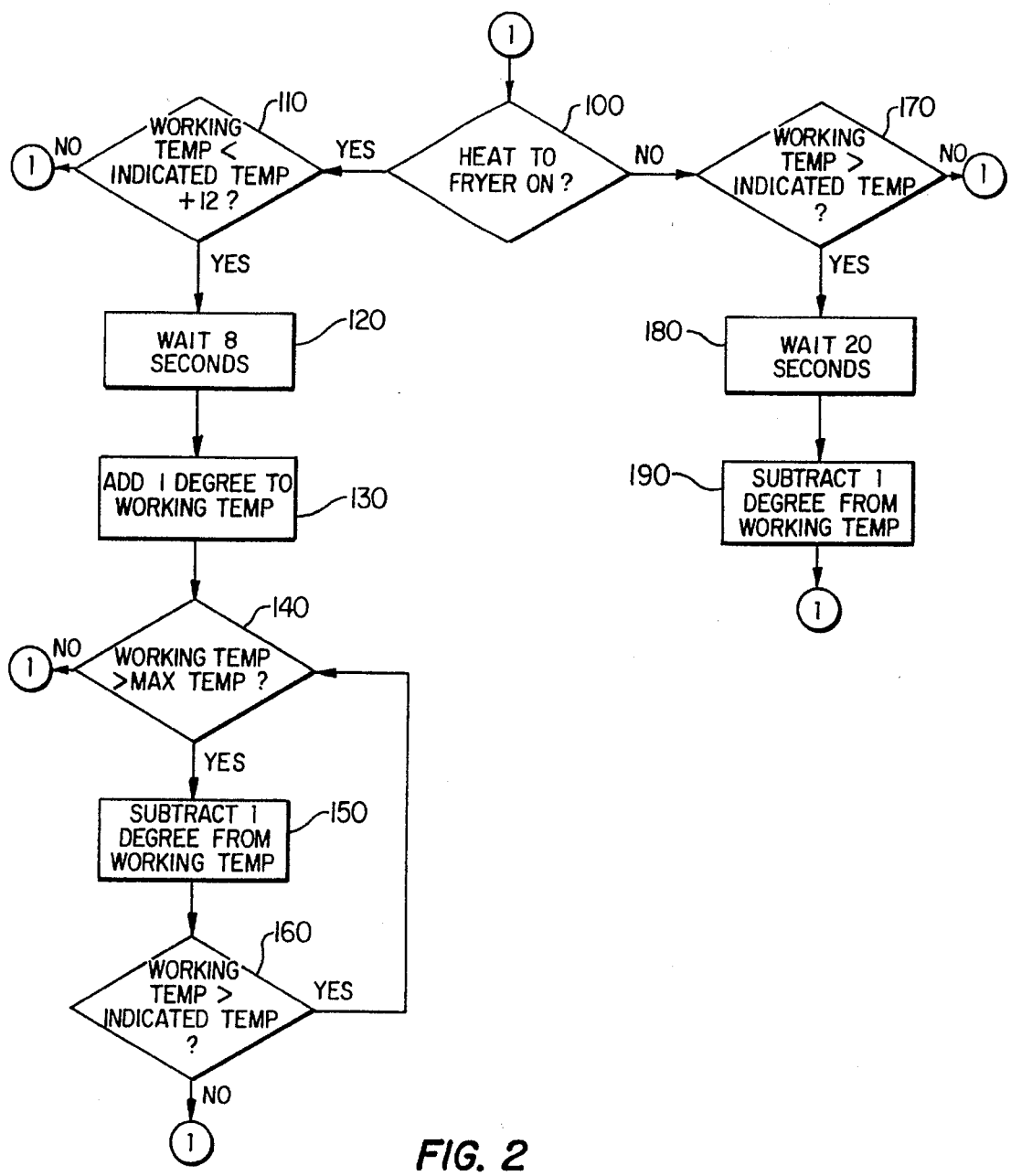
FIG. 2 is a process flowchart of a first feature of the present invention.

Referring to FIG. 2, a flowchart is shown which details the control routine of the first preferred embodiment of the invention. All degree measurements are in degrees Fahrenheit. The process begins at decision point 100 which determines if the main control routine has turned on the burner which applies thermal energy to the fryer. If the burner has been turned on, decision point 110 determines if the working temperature (the temperature value used in calculations performed by the main control routine) is not more than twelve degrees above the indicated temperature. The indicated temperature is the temperature reading of the physical temperature probe located somewhere in or on the fryer. If the working temperature is twelve degrees or more above the indicated temperature, the working temperature is not modified and the process returns to decision point 100.

On the other hand, if decision point 110 determines that the working temperature is not more than twelve degrees above the indicated temperature, the process proceeds to step 120 where there is a delay of eight seconds. This delay is inserted into the process routine because it is desired that the working temperature only be increased every eight seconds. Due to the speed of the controller hardware, the entire routine may be executed in negligible time, therefore it is necessary to insert a wait state into the process. After a delay of eight seconds, the process adds one degree to the working temperature at step 130. This amounts to a periodic rate of increase in working temperature of about one-eighth of a degree per second. Next, decision point 140 determines if the working temperature is greater than the maximum allowable temperature. This maximum allowable temperature is the set point temperature plus the maximum allowable amount of overshoot temperature specified for the food being cooked. If the working temperature has not exceeded this limit, the process returns to decision point 100. If the working temperature has exceeded this limit, step 150 subtracts one degree from the working temperature. After this, decision point 160 determines if the working temperature is still greater than the indicated temperature. If it is, the process returns to decision point 140 to check whether the working temperature is still greater than the maximum allowable temperature. If, on the other hand, the working temperature is not greater than the indicated temperature, it will not be lowered any further and the process returns to decision point 100. Therefore, the working temperature will not exceed the maximum allowable temperature unless the working temperature has been decreased all the way to the indicated temperature and the indicated temperature itself is greater than the maximum allowable temperature.

The above portion of the control routine attempts to anticipate that the actual temperature of the food being cooked in the fryer will continue to rise after the burner is turned off. This is because the thermal mass of the heat transfer chain has energy stored in it which will continue to be transferred to the food even after the thermal energy source (the burner) is removed from the thermal path. Therefore, when the main control routine turns on the burner to apply heat to the fryer, the above process adds one degree to the working temperature ever eight seconds. This temperature addition continues as long as the burner is supplying thermal energy to the system and the working temperature is less than twelve degrees higher than the indicated temperature. The calibration of the working temperature is further limited by the provision that it not exceed the maximum overshoot temperature. Because this working temperature is used by the rest of the control routine to make decisions such as when to turn off the burner, the process of the first preferred embodiment of the present invention achieves more accurate results because the thermal energy stored in the thermal transit path is accounted An analogous process is employed when the burner has been deactivated. Referring again to FIG. 2, if decision point 100 determines that the burner has been turned off, the process moves to decision point 170 which determines if the working temperature is greater than the indicated temperature. If it is not, then no reduction in the working temperature will take place and the process returns to decision point 100. However, if the working temperature does exceed the indicated temperature, the process inserts a delay of twenty seconds at step 180. This delay is necessary because the process should not decrement the working temperature more often than every twenty seconds. After the delay at step 180, step 190 subtracts one degree from the working temperature. This amounts to a periodic rate of decrease of working temperature of about one-twentieth of a degree per second. After this, the process returns to decision point 100.

In the above portion of the control process, which is active when the burner has stopped applying thermal energy to the thermal transit path, allowance is being made for the fact that the temperature of the food being cooked will become lower than the current indicated temperature because the thermal energy is being depleted in the thermal path between the food and the thermal energy source. Because there is some delay between the time of activation of the thermal energy source and the time the food actually receives some of that thermal energy, the food will continue to cool for a period of time after the burner has been activated. This is the time it takes to thermally charge the thermal path to its equilibrium temperature. By anticipating this drop in the temperature of the food, the control system will activate the burner sooner than it would without the compensation, and the food will be maintained nearer to the set point temperature. Consequently, while the burner is deactivated, the routine subtracts one degree of temperature from the working temperature every twenty seconds as long as the working temperature is greater than the indicated temperature.

Appendix A reproduces a software listing of the present invention written in the C language. The code section which is exemplary of the first preferred embodiment of the present invention begins at the line "void process_kfc(void)", in which the variable "counts" represents degrees of temperature.

Figure 3:
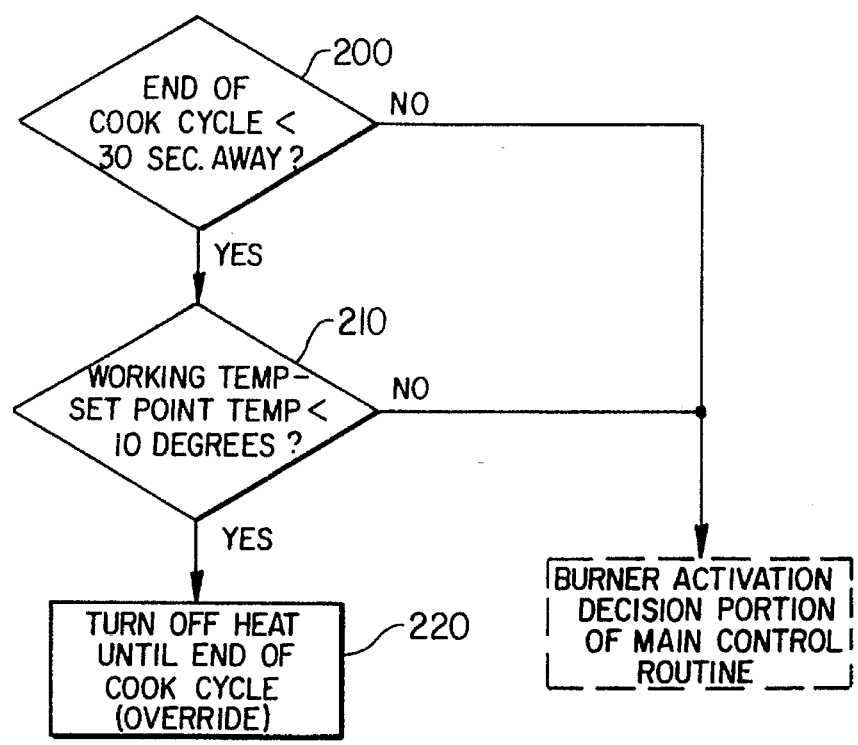
FIG. 3 is a process flowchart of a second feature of the present invention.

Referring now to FIG. 3, a process flowchart illustrating a second preferred embodiment of the present invention is shown. This process is intended to be executed before the main control routine determines if the burner should be activated. Beginning at decision point 200, the process determines if the end of the cook cycle is less than thirty seconds away. If it is not, then the process exits to the burner activation decision portion of the main control routine. However, if the process is within 30 seconds of the end of the cook cycle, the process moves to decision point 210 which determines if the working temperature is within ten degrees of the set point temperature. If it is not, the process once again exits to the burner activation decision portion of the main control routine. If, on the other hand, the working temperature is within ten degrees of the set point temperature, the process activates an override at step 220 which prevents the burner from being activated by any other portion of the control routine during the present cook cycle.

The process of the second preferred embodiment of the present invention recognizes that the thermal mass of the fryer will keep the temperature of the food from being increased before the expiration of the cook cycle (thirty seconds) because the thermal energy from the burner will not reach the food before the end of the cycle. However, if the working temperature is more than ten degrees away from the set point temperature, the main control routine will turn the burner on to a high level which might apply enough thermal energy to the system to reach the food before the end of the cycle.

The code section of Appendix A which is exemplary of the second preferred embodiment of the present invention begins at line "char sp_ch_last(void)" for a split vat and "char sp_ch_last2(void)" for a full vat, in which "post_off_time" represents the preset amount of time away from the end of the cook cycle.

Figure 4:
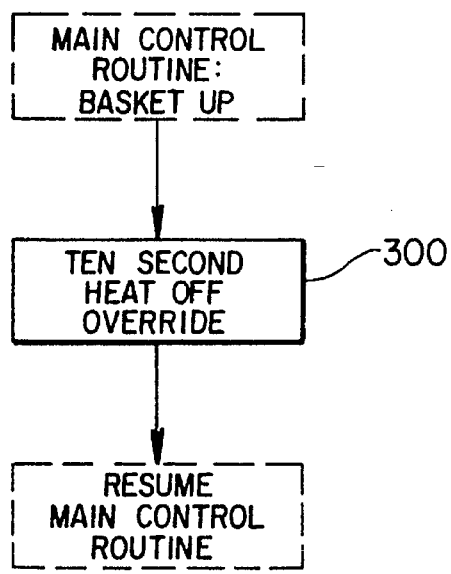
FIG. 4 is a process flowchart of a third feature of the present invention.

Referring now to FIG. 4, a process flowchart of a third preferred embodiment of the present invention is shown. This process is intended to compensate for thermal destabilization of the cooking medium after the food basket is removed from the oil. After the point in the main control routine which lifts the food basket out of the cooking medium, step 300 inserts a fifteen second override which will not allow any other section of the main control routine to activate the burner. The process then continues in the main control routine at the step normally following the basket up command.

The third preferred embodiment of the present invention compensates for the fact that when the food basket is pulled from the cooking medium at the end of the cook cycle, the ensuing turbulence brings cool oil up from the cold zone of the fryer. This cool oil would normally cause the main control routine to activate the burner, resulting in additional overshoot of the cooking medium idle temperature. The process of the third preferred embodiment enables a ten second override to prevent the burner from being activated. This overriding heat off command gives the cooking medium time to stabilize prior to returning to the normal control routine.

The code section of Appendix A which is exemplary of the third preferred embodiment of the present invention begins at line "void set_cook_alarm(int chann)" in which "post_off" is the variable which selects the duration (in seconds) of the heat off override.

Although several preferred embodiments of the present invention have been described in detail herein, those skilled in the art will recognize that various substitutions and modifications may be made to the specific processes shown and described without departing from the spirit and scope of the invention as recited in the appended claims. For example, the recitation of specific temperature increments and decrements, as well as the recitation of specific time intervals are optimized to a specific fryer (Model H50, Frymaster Corp.). It will be obvious to those skilled in the art that appropriate temperature and time values will vary for other types and makes of fryers, but that such values may be determined as a matter of routine design once the novel processes disclosed herein and defined in the appended claims are understood.

What is claimed is:

1. A microprocessor controlled deep fat fryer, comprising:

a frypot for storing a quantity of cooking off;

means for heating said cooking oil in thermal communication with said frypot, in order to cook a food product;

means for sensing a sensed temperature of said cooking oil, said means for sensing being in thermal communication with said cooking oil;

a preprogrammed microprocessor controller to control a cook cycle, wherein said preprogrammed microprocessor controller is connected to said means for sensing in order to receive said sensed temperature and further connected to said means for heating;

a control routine executed by said preprogrammed microprocessor controller to account for variations in said food product's size and temperature by lengthening or shortening said cook cycle; and a value determined by said preprogrammed microprocessor controller representing a working temperature, said working temperature differing from said sensed temperature by an amount sufficient to compensate for a thermal transit time between said means for heating and said means for sensing, wherein said preprogrammed microprocessor controller further operates To deactivate said means for heating until an end of said cook cycle if said cook cycle is within a preset number of seconds from ending and if said working temperature is within a preset number of degrees from a preset temperature.

2. The deep fat fryer of claim 1 wherein said preprogrammed microprocessor controller further operates to regulate said means for heating in accordance with said working temperature.

3. A microprocessor controlled deep fat fryer, comprising:

a frypot for storing a quantity of cooking oil;

means for heating said cooking off in thermal communication with said frypot, in order to cook a food product;

means for sensing a sensed temperature of said cooking oil, said means for sensing being in thermal communication with said cooking oil;

a preprogrammed microprocessor controller operable to regulate said means for heating and to control a cook cycle;

a control routine executed by said preprogrammed microprocessor controller to account for variations in said food product's size and temperature by lengthening or shortening said cook cycle; and a value determined by said preprogrammed microprocessor controller representing a working temperature, said working temperature being independent of said cook cycle and differing from said sensed temperature by an amount sufficient to compensate for a thermal transit time between said means for heating and said means for sensing, wherein said preprogrammed microprocessor controller regulates said means for heating in accordance with said control routine using said working temperature.

4. The deep fat fryer of claim 3 wherein said preprogrammed microprocessor controller further operates to deactivate said means for heating until an end of said cook cycle if said cook cycle is within a preset number of seconds from ending and if said working temperature is within a preset number of degrees from a preset temperature.

5. The deep fat fryer of claim 3 wherein said working temperature is periodically raised while said means for heating is activated and while said working temperature is less than a preset maximum temperature.

6. The deep fat fryer of claim 3 wherein said working temperature is periodically lowered while said means for heating is deactivated and while said working temperature is greater than said sensed temperature.

7. The deep fat fryer of claim 5 wherein said working temperature is periodically raised at a rate of about one-eighth of a degree per second while the means for heating is activated and the working temperature is more than about twelve degrees greater than said sensed temperature.

8. The deep fat fryer of claim 6 wherein said working temperature is periodically lowered at a rate of about one-twentieth of a degree per second while said means for heating is deactivated and while said working temperature is greater than said sensed temperature.

9. The deep fat fryer of claim 3 wherein said working temperature is periodically raised at a rate of about one-eighth of a degree per second while the means for heating is activated and the working temperature is more than about twelve degrees greater than said sensed temperature and the working temperature is periodically lowered at a rate of about one-twentieth of a degree per second while the means for heating is deactivated and the working temperature is greater than said sensed temperature.

10. A microprocessor controlled deep fat fryer having a cook cycle for cooking batches of food product at a predetermined temperature setting with a heating source regulated in accordance with a temperature indication which is different from a sensed temperature in order to control overshoot or under-shoot of the temperature in the frypot, comprising:

a frypot for storing a quantity of cooking oil in which batches of food product are placed for cooking;

a heat source arranged in thermal communication with said frypot for heating said cooking oil to a desired cooking temperature;

said heat source having a thermal mass which stores thermal energy before it is transferred to the frypot and which continues transferring heat energy to the frypot for a period of time after it is turned off;

a preprogrammed microprocessor controller operable to regulate said heating source;

means for sensing the temperature of said cooking oil in the frypot, said sensing means communicating With said preprogrammed microprocessor;

a control routine executed by said preprogrammed microprocessor controller to account for variations in the food product's size and temperature by adjusting the length of a cook cycle; and a value representing a working temperature determined by said preprogrammed microprocessor controller which is independent of the cook cycle and differs from the sensed temperature by a predetermined amount sufficient to compensate for a thermal transit time between the heat source and the means for sensing; and said preprogrammed microprocessor controller being responsive to the working temperature and said control routine to regulate the heating source by turning the heating source on or off in accordance with the working temperature whereby the thermal mass of the heat source is taken into account to reduce the over-shoot or under-shoot of the actual oil temperature from the desired cooking temperature.

11. The deep fat fryer of claim 10 wherein the working temperature is periodically incremented by increasing it if the heat source is on and the working temperature is not more than predetermined number of degrees higher than the sensed temperature and decreasing it if the heat source is off and the working temperature is greater than the sensed temperature.

12. The deep fat flyer of claim 11 having a basket lifting device which lifts a food containing basket from the frypot at the end of a cooking cycle wherein the preprogrammed microprocessor controller activates the basket lifting device and temporarily deactivates the means for heating for a predetermined period after a basket has been lifted from the frypot in order to give the heated cooking oil a time to stabilize before additional heating of the cooking oil can occur.

13. The deep fat fryer of claim 11 wherein said working temperature is periodically incremented at a rate of about one-eighth of a degree per second while the means for heating is activated and the working temperature is more than about twelve degrees greater than said sensed temperature and the working temperature is periodically lowered at a rate of about one-twentieth of a degree per second while the means for heating is deactivated and the working temperature is greater than said sensed temperature.

* * * * *